United States Patent [19]

Ohrt

[11] 4,068,868
[45] Jan. 17, 1978

[54] FLEXIBLE JOINTS FOR MARINE RISERS

[75] Inventor: Juergen H. Ohrt, Kreis, Rensdburg, Germany

[73] Assignee: Vetco Offshore Industries, Inc., Ventura, Calif.

[21] Appl. No.: 609,584

[22] Filed: Sept. 2, 1975

[51] Int. Cl.² ............................................. F16L 27/04
[52] U.S. Cl. .................................... 285/263; 285/223
[58] Field of Search ............... 285/166, 167, 223, 261, 285/263, 276, 280, 281, 51

[56] References Cited

U.S. PATENT DOCUMENTS

| | | | |
|---|---|---|---|
| 3,504,903 | 4/1970 | Irwin | 29/148.4 A X |
| 3,680,895 | 8/1972 | Herbert et al. | 285/223 |
| 3,712,645 | 1/1973 | Herter | 285/167 X |
| 3,848,899 | 11/1974 | Smith | 285/263 |

*Primary Examiner*—Wayne L. Shedd
*Attorney, Agent, or Firm*—Subkow and Kriegel

[57] ABSTRACT

A universal flexible joint for fluid conduits includes an upper body connectible to an upper conduit and a separate lower body connectible to a lower conduit. A housing surrounds both bodies, there being an upper spherical laminated bearing structure, embodying elastomer elements, between the upper body and upper portion of the housing, and a lower spherical laminated bearing structure, embodying elastomer elements, between the lower body and lower portion of the housing, allowing tensile force to be transmitted from the upper body through the upper bearing structure to the housing and through the lower bearing structure to the lower body, while permitting universal movement between the upper body and lower body relative to the housing. A seal assembly including upper and lower spherical laminated seal structures, each embodying elastomer elements, is disposed between the upper and lower bodies to prevent fluid passage between the interior of the bodies and the housing and to transmit compressive loads therebetween while permitting relative universal movement between the upper and lower bodies.

19 Claims, 5 Drawing Figures

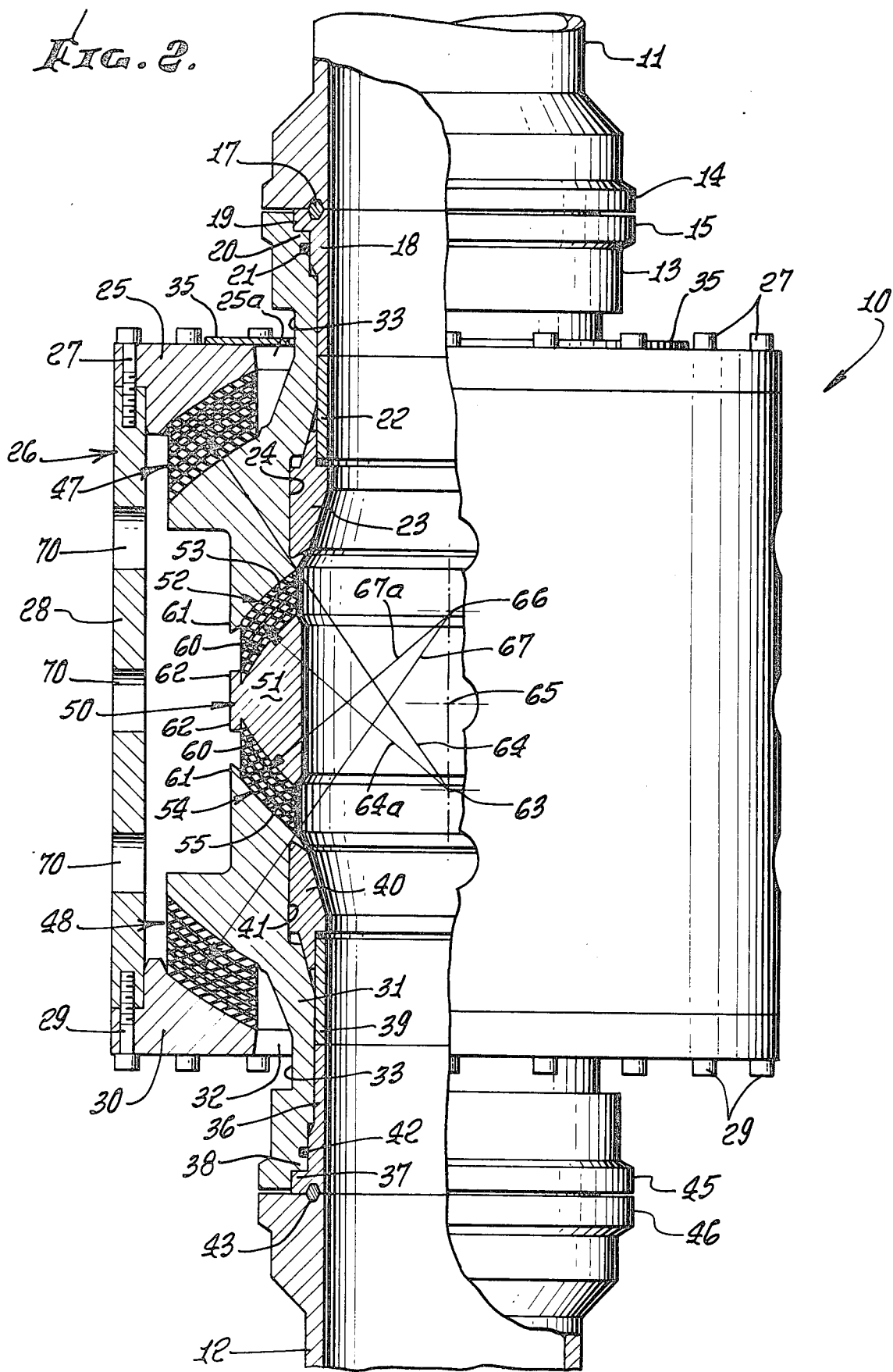

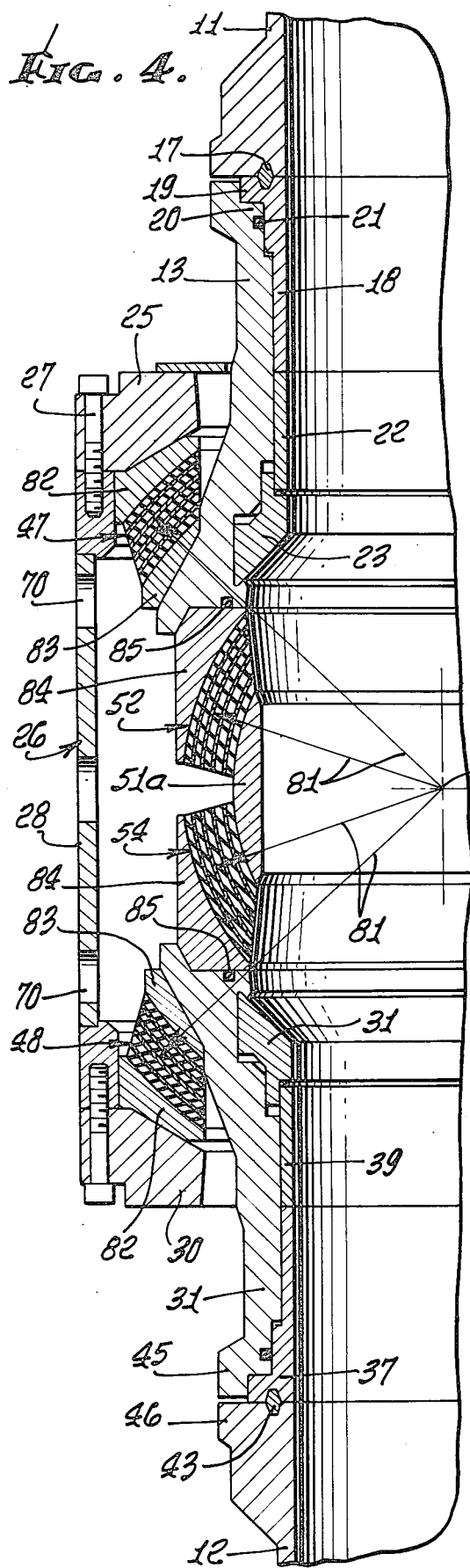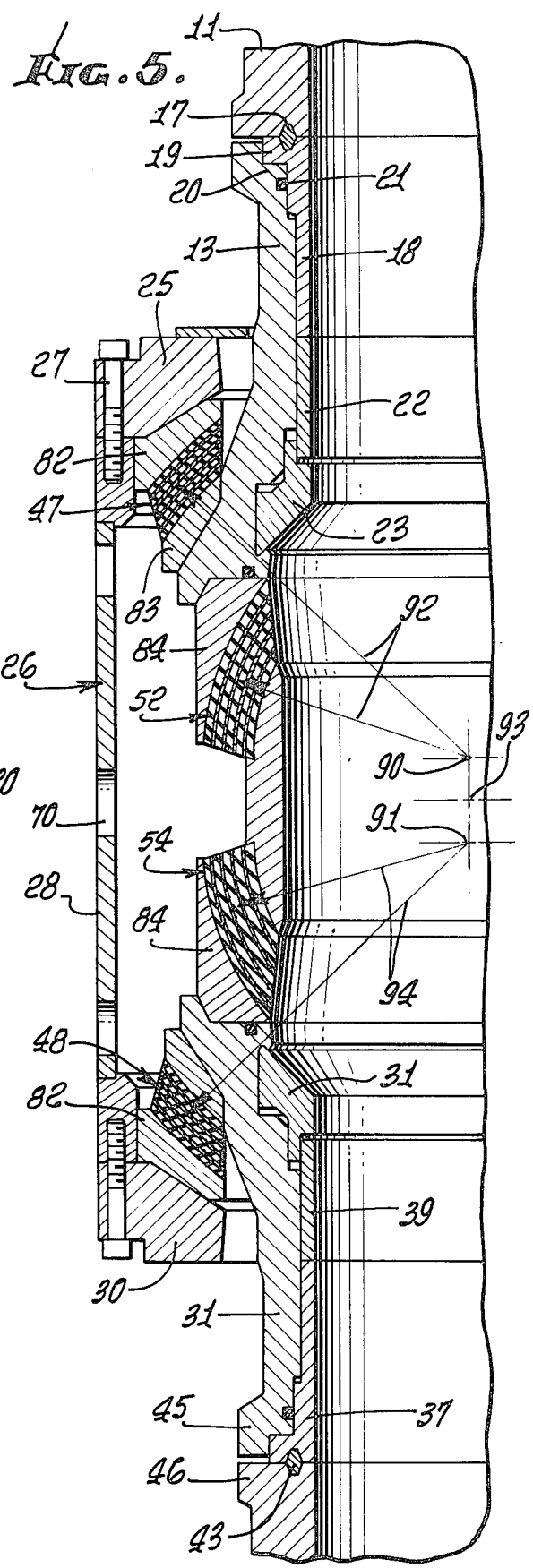

FLEXIBLE JOINTS FOR MARINE RISERS

This invention relates to flexible joints, and more particularly to tubular flexible joints for use with marine risers and associated equipment used in the drilling of subsea well bores.

In the drilling of offshore well bores, a marine riser is provided which extends from a surface drilling vessel to the region of the ocean floor. One or more flexible joints are incorporated in the marine riser to reduce bending stresses between the upper and lower portions of the riser. These flexible joints must provide a seal preventing leakage of fluid from the interior of the joint to the sea water externally thereof, which would otherwise occur because of the differential pressure within the joint arising from the difference in specific gravity of the drilling mud within the riser and the sea water externally of the riser. Moreover, a substantial portion of the weight of the marine riser is offset by applying tension to it. This tensile force or pull is also transmitted through the flexible joint. As the water depth increases in which the drilling operation is being performed, the differential pressure within the riser and the amount of the external pull imposed on the riser increases.

Existing flexible joints used in connection with marine risers have been found to be unsuitable for increased water depths because of the difficulty in sealing the joint against leakage due to the high differential pressure between the drilling mud within the riser and the sea water externally thereof. In some joints, the high external pull on the riser introduces friction which restricts the relative movement between the joint parts, and causes wear which eventually will result in joint leakage. A balancing pressure has been provided to compensate for the high tensile force or pull imposed on the joint and for the high separating forces due to the high pressure differential, such as proposed in U.S. Pat. No. 3,746,372, but the required pressure becomes greater than the control pressure normally available when the joint is disposed in greatly increased water depths.

A flexible joint is disclosed in U.S. Pat. No. 3,680,895, in which laminated bearings are provided between the upper and lower body members of the joint for transmitting stresses therebetween, which also function to seal the joint against leakage that could result from the high differential pressure existing within the marine riser and joint. In the joints disclosed in the patent, internal fluid pressure enters the housing through which the bearing loads are transmitted, and this high pressure of the fluid acts on the bearings and puts additional load on them, which necessarily must be dimensioned to withstand such loads. Moreover, compressive loads imposed on the joint disclosed in FIG. 4 of U.S. Pat. No. 3,680,895 is transmitted through an intervening member, which tends to collapse under high compressive loads, such compressive loads also introducing undesired friction between the upper and lower body members and the intervening part referred to.

In general, the present invention embodies flex joints of the general type disclosed in U.S. Pat. No. 3,680,895, but in which the bearing members and the seal assembly are separate from one another. The bearing members and seal assembly comprise alternate layers or laminations of rigid shims and elastomeric members, the bearings being surrounded by a housing structure which serves as the intervening agency for transmitting the axial load between the upper body portion of the joint and the lower body portion of the joint, while permitting flexing of the upper and lower bodies with respect to each other. The seal assembly is disposed between the confronting ends of the upper and lower bodies themselves. The bearing assemblies and seal assemblies are held in appropriate assembled relation by the housing, which imposes a preload or compression on the bearing assemblies and seal assemblies. The spring rate of the seal assemblies is much lower than the spring rate of the bearing assemblies, so that the preloading of the entire assembly creates a greater deflection in the seal assembly than in the bearing assembly, causing the seal assembly to always remain in compression despite the fact that the tensile pull on the joint may increase, which tends to increase the distance of the upper body from the lower body. Since the seal assembly always remain in compression, assurance is had against leakage of the flexible joint. Moreover, the seal assembly serves to transmit compressive loads from one body to the other, eliminating the need for such loads to be transmitted through the surrounding housing. However, tensile loads are transmitted through the bearing assemblies and the housing. Despite variations in the axial loads imposed on the assembly, the laminated bearing structures and the laminated seal assembly structures always remain under a preload compression, with the lower spring rate of the seal assembly insuring the maintenance of such compression and the prevention of leaks between the interior of the joint and its exterior.

This invention possesses many other advantages, and has other purposes which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 2 is an enlarged side elevational view and longitudinal section through the marine riser disclosed in FIG. 1;

FIG. 4 is a quarter longitudinal section, corresponding to FIG. 2, through another embodiment of the invention; and FIG. 5 is a quarter longitudinal section, corresponding to FIG. 2, through yet another specific form of the invention.

Figure 1:
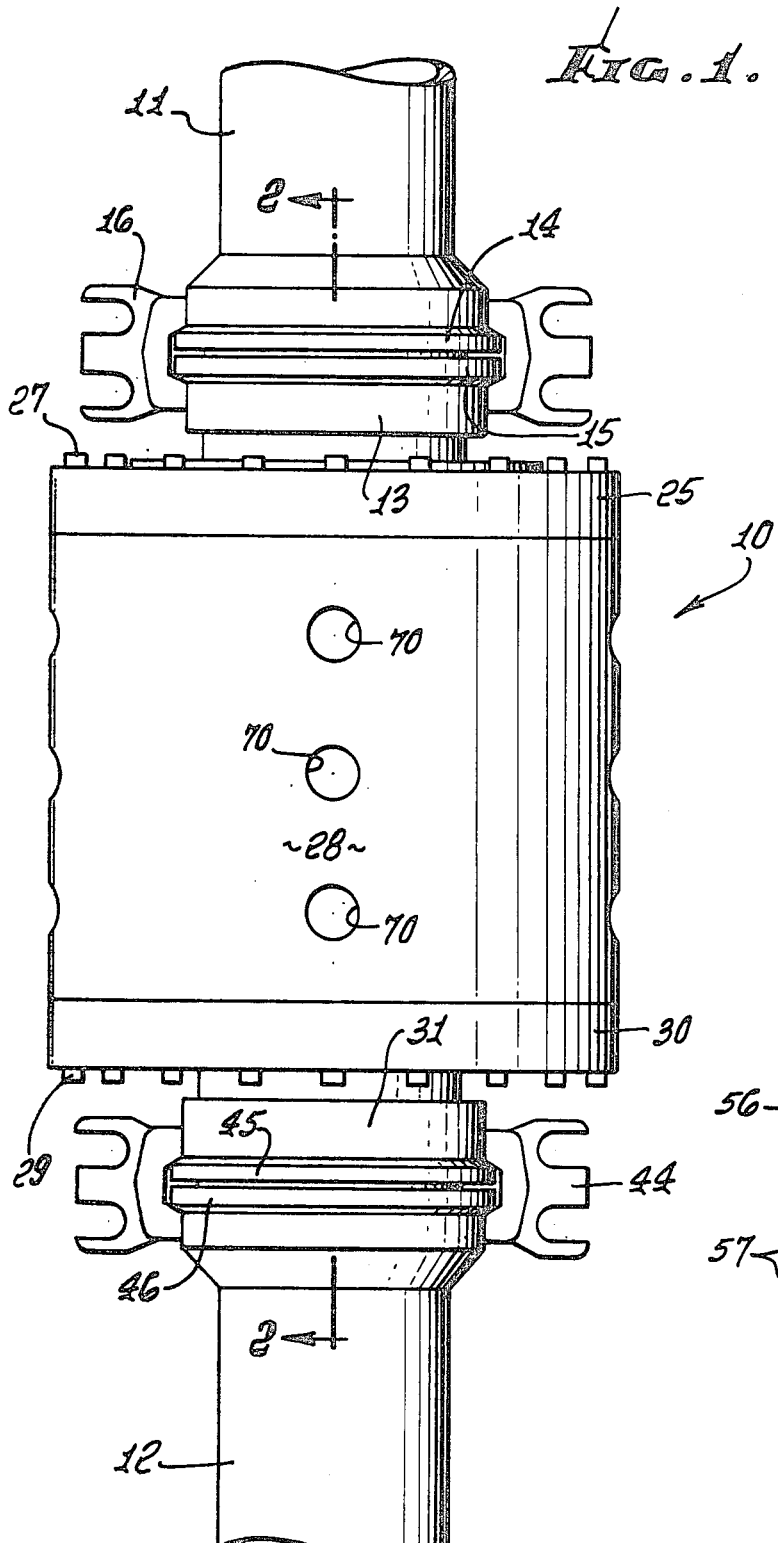
FIG. 1 is a side elevational view of a flexible joint incorporated within a marine riser conductor.

As illustrated in the drawings, a flexible joint 10 is connected to the lower end of an upper marine riser section 11, and to the upper end of a lower marine section 12, or other subsea member, such as a blowout preventer stack. The marine riser itself extends upwardly to a platform or drilling vessel (not shown) floating in a body of water, the major portion of the entire weight of the marine riser being supported by a suitable riser tensioning apparatus (not shown) mounted on the vessel, in a known manner.

The upper riser or tubular section 11 is suitably coupled to the upper tubular body 13 of the flexible joint. As shown, the upper section has a lower external flange 14 confronting a companion external flange 15 on the upper body, a suitable clamp 16 of a known type engaging both flanges, forcing and holding them toward one another, and compressing a seal ring or gasket 17 between the lower flange 14 and the upper end of a retainer member 18 disposed within the upper body and having an external flange 19 seating against a shoulder 20 in the upper body. A suitable seal ring 21 in the upper body engages the periphery of the retainer 18 to prevent fluid leakage therebetween. The lower end of the retainer engages a wear bushing 22 which, in turn, is disposed within the upper portion of another wear bushing 23 mounted in a circumferential groove 24 in the upper body.

The upper body 13 extends freely through a bore 25a within an upper member 25 of an outer housing 26. The upper member is secured by a plurality of circumferentially spaced screws 27 to a housing sleeve 28, the lower end of which is secured by circumferentially spaced screws 29 to a lower member 30 of the housing. The housing itself encloses both the upper body 13 and a lower body 31, the latter extending through an axial bore 32 in the lower housing member. The peripheral portion 33 of the lower body that extends through the lower housing member 30 has a substantially smaller diameter than the inside diameter of the bore 32, in order to permit relative tilting of the lower body 31 relative to the housing 26, as described hereinbelow. Similarly, the upper body 13 has a reduced diameter peripheral portion 33 extending through the axial bore 25a, which is of substantially smaller diameter than the internal diameter of the bore, to permit the upper body 13 to tilt universally in all directions with respect to the housing. For the purposes of preventing substances of large size from entering the upper bore 25a, a suitable shield 35, which may be made of a plurality of sections suitably secured together, rests upon the upper member 25 and projects across the space between the wall of the bore 25a and the upper body. This shield can shift or slide laterally on the upper housing member 25 in response to movement of the upper body 13 relative to the housing 26.

A retainer 36 is also mounted within the lower body 31 with its flange 37 engaging a downwardly facing body seat 38, this retainer engaging a wear bushing 39 thereabove disposed within another wear bushing 40 mounted within a circumferential groove 41 in the lower body. A seal ring 42 in the lower body sealingly engages the retainer 36 to prevent leakage of fluid between the retainer and body. A seal ring or gasket 43 is clamped between the lower riser section or blowout preventer stack 12 by suitable clamps 44 embracing the opposed flanges 45, 46 on the lower body 31 and the lower riser section. The upper and lower clamps are omitted from FIGS. 2, 4 and 5 in the interest of clarity.

The tensile force imposed upon the marine riser is transmitted from the upper body 13 to the housing 26 through an upper bearing assembly 47. Similarly, the tensile force is transmitted from the housing to the lower body 31 through a lower bearing assembly 48. As described hereinbelow, both of these assemblies are laminated structures to not only transmit axial forces between the bodies 13, 31 and the housing 26, but to permit relative tilting in all directions of the bodies with respect to the housing and of the upper and lower bodies with repect to one another.

Diposed between the bodies 13, 31 is a seal assembly 50 to prevent fluid leakage between the interior of the flexible joint and the exterior of the assembly disposed within the housing 26. This seal assembly includes an intermediate body 51 and an upper seal structure 52 between the intermediate body and the lower end 53 of the upper body 13. Similarly, the seal assembly includes a lower seal structure 54 between the intermediate body and the upper end 55 of the lower body 31. These structures 52, 54 are also laminated and are capable of permitting relative flexing or tilting in all directions of the upper and lower bodies 13, 31 with respect to the intermediate body 51 while maintaining the integrity of the seal assembly.

Figure 3:
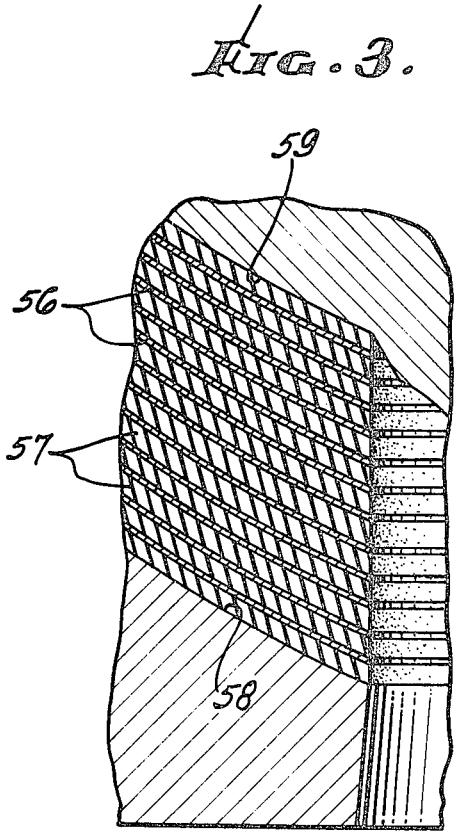
FIG. 3 is a further enlarged fragmentary longitudinal section through a portion of the lower bearing assembly.

The upper and lower bearing assemblies 47, 48 are the same, being disposed opposite to one another. They are each fabricated with alternate layers of rigid segments or annuli 56 (see FIG. 3), such as steel or fabric, which may be woven nylon or glass fibers, and elastomeric segments or annuli 57, such as natural or synthetic rubber, the rigid layers being of substantially less thickness than the elastomer layers. Specifically, the segmental layers 56, 57 are of substantially spherical shape, with the outermost layers engaging companion substantially concave spherical shape surfaces 58 on the upper and lower housing members 25, 30 and the innermost layers bearing against substantially convex spherical bearing surfaces 59 on the upper and lower bodies 13, 31 disposed within the housing 26. If the outermost and innermost layers of each bearing assembly are made of elastomeric materials 57, such layers are secured, as by vulcanizing, to the surfaces 58, 59 of the housing members and bodies against which they bear, the elastomeric and rigid layers 57, 56 also being suitably secured to one another, as by vulcanization, If the outermost and innermost layers are rigid, separate seal elements (not shown) are provided between such rigid elements and their confronting surfaces 58, 59 on the end housing members and bodies 13, 31, which are bonded against the metallic surfaces of the bodies and end housing members.

Similarly, the upper and lower seal structures 52, 54 oppose one another, and may be duplicates of one another. Essentially, they are the same in construction as the bearing assemblies 47, 48 and are of generally spherical shape. They consist of alternate layers of rigid spherical segments or annuli 56, made of steel or fabric, such as woven nylon or glass fibers, with intervening elastomeric spherical segments or annuli 57, which are much thicker than the rigid layers. The outer elastomer layer 57 of each seal structure is suitably secured, as by vulcanizing, to the confronting concave inner end surface 53 of its companion body 13 or 31; whereas, the opposite elastomer layer 57 is vulcanized to the convex surface 60 of the intermediate body 51. A short circumferential skirt 61 may extend from each body around the exterior of its associated seal structure, which is also true of intermediate body skirts 62 that extend around the opposite ends of the seal structures, as assurance of further retaining each seal structure 52, 54 in place.

The upper substantially spherical bearing assembly layers 56, 57 and the concave and convex surfaces 58, 59 that they engage have a common center 63, as indicated by the radial line 64 disclosed in FIG. 2, this center being below the center 65 of the entire flexible joint. The spherical seal surfaces 53, 60 and the spherical seal layers 56, 57 have the same common center 63, as indicated by the radial line 64a. The center 66 of the spherical surfaces 58, 59 on the lower end housing member 30 and body 31, and their intervening bearing assembly segments 56, 57, and also of the concave surface 55 on the lower body and opposed convex surface 60 on the intermediate body 51, and the seal structure segments 56, 57 disposed therebetween is above the center 65 of the flexible joint unit, all of these surfaces and layers having a common center, as indicated by the radial lines 67, 67a. In effect, the radial lines 64, 64a and 67, 67a for developing the spherical surfaces overlap or cross one another, being drawn from overlapping upper and lower centers 66, 63, which enables the entire flexible joint to be made much shorter in length than if all of the spherical surfaces of the flexible joint were developed from a common center, such as 65.

Upon assembly of the flexible joint, the end housing members 25, 30 are secured to the surrounding housing sleeve 28 by the screws 27. As a result of tightening the screws, the upper and lower seal structures 52, 54 and the upper and lower bearing assemblies 47, 48 are placed under compression, the elastomeric spherical segments 57 being compressed and functioning as springs to retain the integrity of each structure and assembly. The seal structures have a substantially lower spring rate than the spring rate of the bearing assemblies, which insures that the laminations of the seal structures will remain in sealed relation to each other and to the upper and lower bodies as the axial load, such as the tensile force imposed upon the upper portion of the marine riser, increases and decreases. This tensile load is transmitted directly from the upper body 13 through the upper bearing assembly 47 to the housing structure 26, and from the housing structure through the lower bearing assembly 48 to the lower body 31, without such load being imposed upon the seal assembly 50. An increase in the tensile load, for example, will compress the high rate spring upper bearing assembly 47 and will decrease the compressive force on the seal assembly 50. However, because of the seal assembly structures having a lower spring rate than the bearing assemblies, the elastomer layers 57 of the seal structures will expand sufficiently to maintain the integrity of the seal structures and prevent fluid leakage between the interior of the tubular flexible joint and the exterior of the seal assemblies and bearing assemblies. In this connection, it is to be noted that the housing sleeve 28 has openings 70 therein so that the interior and exterior of the housing are subject to the same hydrostatic heads of fluid of the surrounding sea or ocean water environment. The fluid pressure within the riser flexible joint is not imposed upon the housing. In the event the joint is subjected to compressive loads, such loads are transmitted from the upper body 13 through the seal assembly 50 to the lower body 31, without being transmitted through the upper and lower bearing assemblies 47, 48 and the outer housing structure 50.

With the flexible joint illustrated and described, the upper body 13 can tilt in all directions with respect to the housing 26, and the housing can tilt in all directions with respect to the lower body 31, with the result that the two bodies 13, 31 can tilt in all directions with respect to each other to a substantial degree, which, for example, may be as much as a 20° included angle. Since the rubber or other elastomeric layers 57, which are permanently bonded to the intervening rigid layers 56, have a relatively low shear modulus, the adjacent rigid layers can move very easily in relation to each other, making the total movement of each bearing assembly or seal structure the sum of the movement of the individual layers. Despite the substantial relative angular movement of the seal structures 52, 54 with respect to the upper and lower bodies 13, 31 and the intermediate body 51, the entire seal assembly 50 prevents fluid leakage over the full range of tilting movement of the upper and lower bodies with respect to each other.

In the embodiment of the invention disclosed in FIG. 4, the bearing assembly and seal assembly structures have a common center 80, as indicated by the radial lines 81. There is a specific difference in the bearing assembly and seal assembly structures. Each bearing assembly has an outer metallic bearing ring 82 bearing against each outer end housing member 25, 30 and an inner metallic bearing ring 83 bearing against each body member 13, 31, the laminated rigid and elastomer spherical segments 56, 57 being bonded to each other and to the inner and outer rings 82, 83. With respect to the seal assembly, an outer metallic ring 84 bears against the inner end of each body 13, 31 and an intermediate body 51a is suitably secured, as by vulcanizing, to the inner layer of each seal structure 52, 54. To prevent leakage between the outer seal member 84 and the bodies 13, 31, a suitable elastomer seal ring 85 is carried by each body, engaging a companion seal surface of the outer ring 84.

The radial line overlapping spherical relationship disclosed in FIG. 2 not only makes the flexible joint 10 more compact, but also places the bearing assemblies 47, 48 and seal structures 52, 54 in a position in which the axial loads are transmitted in compression through the bearing and seal structures to a greater extent that the laminated bearing and seal structures illustrated in FIG. 4, which are developed about a common center 80. As disclosed in FIG. 4, the loads are transmitted through the laminated structures to a greater extent in shear, as a result of axial movement of the bodies 13, 31 relative to one another and of the universal tilting of the bodies with respect to each other. The rigid members 56 can shift readily with respect to each other in transmitting shear through the laminated assemblies because of the flexible characteristics of the elastomeric layers 57.

In the embodiment of the invention disclosed in FIG. 5, the flexible joint is substantially the same as disclosed in FIG. 4, except that the centers 90, 91 about which the upper and lower laminated structures and spherical and seal surfaces are developed are spaced from one another. As disclosed, the radii of curvature 92 for the upper bearing assembly and the upper seal structure extend from a single center 90, which is spaced upwardly from the common center 93 of the flexible joint unit. Similarly, the radii of curvature 94 of the spherical surfaces of the lower bearing assembly and the lower seal structure extend from a single center 91 which is spaced below the common center 94 of the flexible joint unit. With this arrangement, the laminated elements 56, 57 have a greater amount of shear stress imposed upon them than the flexible joint disclosed in FIG. 4, as a result of the tilting of the upper body 13 relative to the lower body 31. Because of the spherical surfaces involved, the tilting action is universal in that it can occur in all directions.

In the various forms of the invention, reference has been made to spherical surfaces. However, these surfaces need not be spherical in a true geometric sense, since they could be made somewhat conical and an operable flexible joint provided because of the elastomeric properties present in the bearing assemblies and the seal structures.

I claim:

1. A flexible joint through which fluid can be conducted comprising: first and second bodies having a fluid passage therethrough and adapted to be disposed in a tubular string, a housing structure surrounding said bodies, a first bearing assembly between and engaging said first body and housing structure for transmitting loads therebetween while permitting relative tilting between said first body and housing structure, a second bearing assembly between and engaging said second body and housing structure for transmitting loads therebetween while permitting relative tilting between said second body and housing structure, and a seal assembly between and engaging said bodies to prevent fluid flow between said passage and the exterior of said bodies, said seal assembly including means for transmitting axial loads between said bodies while permitting relative tilting between said bodies, each of said bearing assemblies including laminations of alternate layers of rigid material and yieldable material and secured to a body and housing structure, said seal assembly including a third body between said first and second bodies and laminations of alternate layers of rigid material and yieldable material between and secured to said third body and each of said first and second bodies, said housing structure including means for compressing said first and second bearing assemblies between said housing structure and first and second bodies and said seal assembly laminations between said third body and said first and second bodies.

2. A flexible joint as defined in claim 1, said seal assembly laminations being constructed and arranged to have a lower spring rate than said bearing assembly laminations.

3. A flexible joint as defined in claim 1; said yieldable material of each bearing assembly being an elastomeric material, said yieldable material of said seal assembly being an elastomeric material.

4. A flexible joint as defined in claim 3; said seal assembly laminations being constructed and arranged to have a lower spring rate than said bearing assembly laminations.

5. A flexible joint as defined in claim 1; said housing structure having passage means for establishing communication between the exterior and interior of said structure.

6. A flexible joint through which fluid can be conducted comprising: first and second bodies having a fluid passage therethrough and adapted to be disposed in a tubular string, said first and second bodies having first and second generally spherical bearing surfaces, respectively, and also first and second generally spherical seal surfaces, respectively, a housing structure surrounding said bodies and having spaced generally spherical first and second bearing surfaces confronting said bearing surfaces on said first and second bodies, respectively, a first bearing assembly between and engaging said first body bearing surface and said first bearing surface on said housing structure, a second bearing assembly between and engaging said second body bearing surface and said second bearing surface on said housing structure, a third body between said first and second bodies and having generally spherical first and second seal surfaces confronting said first and second body seal surfaces, respectively, first and second seal structures between and engaging said third body first and second seal surfaces, respectively, and said first and second body seal surfaces, respectively, said housing structure including means for compressing said first and second bearing assemblies between said housing structure and first and second bodies and said seal structures between said third body and said first and second bodies, each of said bearing assemblies including generally spherical laminations of alternate layers of rigid material and yieldable material and secured to a first or second body and said housing structure, each of said seal structures including generally spherical laminations of alternate layers of rigid material and yieldable material secured to said third body and each of said first and second bodies.

7. A flexible joint as defined in claim 6; said seal structures being constructed and arranged to have a lower spring rate than said bearing assemblies.

8. A flexible joint as defined in claim 6; said yieldable material of each bearing assembly being an elastomeric material, said yieldable material of said seal structures being an elastomeric material.

9. A flexible joint as defined in claim 8; said seal structure being constructed and arranged to have a lower spring rate than said bearing assemblies.

10. A flexible joint as defined in claim 6; said housing structure having passage means for establishing communication between the exterior and interior of said structure.

11. A flexible joint as defined in claim 6; said first bearing surfaces and bearing assembly laminations between said first bearing surfaces, said first seal surfaces and seal structure laminations between said first seal surfaces having radii of curvature extending from a first common center, said second bearing surfaces and bearing assembly laminations between said second bearing surfaces, second seal surfaces and seal structure laminations between said second seal surfaces having radii of curvature extending from a second common center spaced axially from said first common center.

12. A flexible joint as defined in claim 11; said common centers being so located with respect to each other that radii drawn from said first common center to said first bearing surfaces, first seal surfaces, laminations between said first bearing surfaces and laminations between said first seal surfaces cross radii drawn from said second common center to said second bearing surfaces, second seal surfaces, laminations between said second bearing surfaces and laminations between said second seal surfaces.

13. A flexible joint as defined in claim 12; said seal structures being constructed and arranged to have a lower spring rate than said bearing assemblies.

14. A flexible joint as defined in claim 13; said yieldable material of said bearing assembly laminations and yieldable material of said seal structure laminations being elastomeric.

15. A flexible joint as defined in claim 11; said common centers being so located with respect to each other that radii drawn from said first common center to said first bearing surfaces, first seal surfaces, laminations between said first bearing surfaces and laminations between said first seal surfaces are spaced in their entirety from radii drawn from said second common center to said second bearing surfaces, second seal surfaces, laminations between said second bearing surfaces and laminations between said second seal surfaces.

16. A flexible joint as defined in claim 15; said seal structures being constructed and arranged to have a lower spring rate than said bearing assemblies.

17. A flexible joint as defined in claim 16; said yieldable material of said bearing assembly laminations and yieldable material of said seal structure laminations being elastomeric.

18. A flexible joint as defined in claim 11; said seal structures being constructed and arranged to have a lower spring rate than said bearing assemblies.

19. A flexible joint as defined in claim 18; said yieldable material of said bearing assembly laminations and yieldable material of said seal structure laminations being elastomeric.

* * * * *